United States Patent [19]

Hokkanji et al.

[11] 4,089,483
[45] May 16, 1978

[54] FILM FEEDING DEVICE FOR CAMERA

[75] Inventors: Sakae Hokkanji, Fukushima; Masami Shimizu; Akio Sunouchi, both of Tokyo; Yukio Iura, Yokosuka; Masayoshi Yamamichi, Kawasaki; Yoshiaki Watanabe, Fujisawa, all of Japan

[73] Assignee: Canon Kabushiki Kaisha, Tokyo, Japan

[21] Appl. No.: 762,247

[22] Filed: Jan. 25, 1977

[30] Foreign Application Priority Data

Feb. 4, 1976 Japan .............................. 51-11630[U]

[51] Int. Cl.² .............................................. G03B 1/06
[52] U.S. Cl. .................................. 242/71.4; 354/212; 354/214
[58] Field of Search ..................... 242/71.4, 71.3, 71.5, 242/71.6; 354/212, 213, 214

[56] References Cited

U.S. PATENT DOCUMENTS

| | | | |
|---|---|---|---|
| 3,485,156 | 12/1930 | Takahashi | 242/71.6 X |
| 3,621,770 | 11/1971 | Tsuruoka | 242/71.4 X |
| 3,645,182 | 2/1972 | Kimura | 242/71.4 X |
| 3,757,660 | 9/1973 | Kuramoto | 242/71.4 X |
| 3,967,291 | 6/1976 | Nagashima | 242/71.5 X |

*Primary Examiner*—Edward J. McCarthy
*Attorney, Agent, or Firm*—Toren, McGeady and Stanger

[57] ABSTRACT

A film feeding device for a camera including a rotatable center shaft member having a protrudent clutch pin, the center shaft being movable alone in the direction of its axis; a rotatable film feeding sprocket which has a slot to allow the protrudent pin to engage therewith and which thus moves together with the center shaft member when the center shaft rotates; a drive device which is provided with a clutch groove to allow the protrudent pin to engage with and disengage from the clutch groove, the drive device being arranged to rotate in response to a film winding operation. When the center shaft shifts to one side defined by the slot, the protrudent clutch pin comes to engage with the clutch groove to cause the sprocket to rotate in response to the film winding operation. When the center shaft shifts to the other side, the protrudent clutch pin is disengaged from the clutch groove to permit free rotation of the sprocket. Thus, rotation of the sprocket is controlled by means of the single protrudent pin in such a manner as to minimize variation in spacing between one photographed picture and another.

10 Claims, 3 Drawing Figures

FILM FEEDING DEVICE FOR CAMERA

BACKGROUND OF THE INVENTION

1. Field of the Invention:

This invention relates to a film feeding device for a camera.

2. Description of the Prior Art:

In a camera which is used by loading it with a film having perforation providing along the edges thereof such as a 35 mm film and which is arranged to accomplish film feeding to a set length and film rewinding, after photographing, by means of a sprocket which is provided inside the camera, the sprocket which is disposed in the path of the film is allowed to rotate only in response to the operation of a film wind-up lever when the set-length film feeding operation is made, the sprocket then rotating to follow the forward movement of the film to a film take-up spool. For film rewinding, the sprocket is allowed to freely rotate to follow the film movement back to the rewinding side. Therefore, there is provided a driving force transmitting mechanism between the film wind-up lever and the sprocket for the purpose of transmitting the action of the lever to the sprocket. The driving force transmitting mechanism is arranged to rotate the sprocket only to an extent corresponding to the operating extent of the film wind-up lever. Accordingly, the mechanism is readily operable when operated by the film wind-up lever. However, it cannot be readily operated from the sprocket side because of a large load of the transmission arragement thereof. For rewinding film, the film is rewound by means of a film rewinding lever back to a film feeding spool. However, there is provided no cooperative arrangement between the film rewinding lever and the force transmitting mechanism. For rewinding the film by operating the film rewinding lever, therefore, the force transmitting mechanism imposes a load on the sprocket to hinder the smooth rotation of the sprocket. Such hindrance in turn hinders the sprocket from coming into engagement with the perforation of the film and the film cannot be smoothly rewound under such a condition. To solve this problem, in the film feeding device employed in the conventional cameras, there is provided a clutch mechanism between a driving force transmitting mechanism and a sprocket to operate the clutch mechanism in such a way as to disengage the sprocket from the force transmitting mechanism for rewinding the film to ensure free rotation of the sprocket. The conventional clutch mechanism employed in the film feeding device of the conventional camera comprises a center shaft member which is slidable inside a film feeding sprocket and which is provided with a protrudent pin arranged to engage with a slot provided in the sprocket; and a protrudent clutch pin which engages with and disengages from a clutch groove provided in a drive device which rotates in response to a film winding operation. The pin which is provided in combination with the slot of the sprocket allows the center shaft to move alone in the direction of its axis and then causes the sprocket to rotate together with the center shaft when the shaft rotates. On the other hand, the protrudent clutch pin comes to engage with the clutch groove when the center shaft moves to one side within the restriction defined by the protrudent pin and the slot of the sprocket and thus transmits the force of the drive device to the sprocket through the center shaft and the protrudent pin. When the center shaft moves to the other side, the clutch pin, comes to disengage from the clutch groove to release the sprocket from engagement with the drive device to permit free rotation thereof. Thus, in the film feeding device of the conventional camera of this type, the rotation of the drive device is transmitted to the sprocket through the clutch groove, protrudent clutch pin, protrudent pin and the slot. Therefore, when the protrudent clutch pin engages with the clutch groove and the protrudent pin with the slot, if there are any gaps or clearances between these engaging parts, there arises a play which results from the sum of these gaps. Since these engaging parts are very small in diameter, such a play is enlarged at the drive device and becomes a great value there. Under such a condition, even if the sprocket is accurately turned by a film winding operation to a degree of angle exactly corresponding to one frame of the film, the resilience of the film resulting from its wound-up state causes the sprocket to turn backward as much as the degree of the play after the sprocket is stopped. The backward rotation then causes uneven spacing between one picture and another.

SUMMARY OF THE INVENTION

It is an object of this invention to provide a film feeding device for a camera which solves the above mentioned problem experienced with the conventional film feeding device by reducing the unevenness of spacing between pictures.

It is another object of this invention to provide a film feeding device for a camera which not only reduces unevenness of picture spacing but also permits double exposure photographing as desired.

These and other objects of the invention will become apparent by reference to the following detailed description when considered in connection with the accompanying drawings.exerts a

Figure 1:
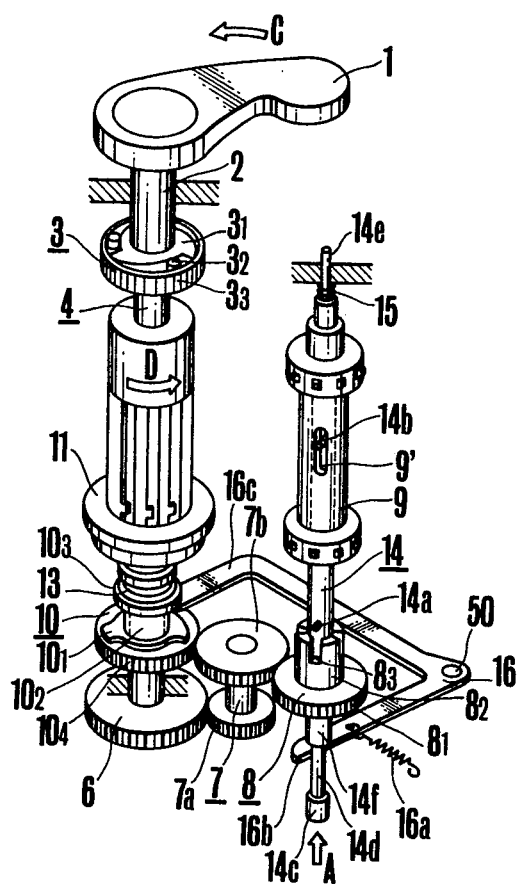
FIG. 1 is an oblique view illustrating the film feeding device of the conventional camera.

DESCRIPTION OF THE PREFERRED EMBODIMENTS:

Referring to the accompanying drawings, the film feeding device of the conventional camera and the film feeding device for a camera of the present invention are described as follows:

In FIG. 1 which is an oblique view illustrating a film feeding device employed for conventional cameras, a reference numeral 2 indicates a wind-up lever shaft which is rotatably supported by a camera body; 1 indicates a film wind-up lever which is secured to one end of the wind-up lever shaft 2 protruding from the camera body; and 3 indicates a one-way clutch device consisting of claw $3_1$ and rolls $3_2$. On the outer circumference of the one-way clutch device 3, there is provided a toothed wheel $3_3$ which is provided for actuating an unillustrated shutter charging mechanism. The clutch claw $3_1$ of the one-way clutch device 3 is secured to the other end of the lever shaft 2. When the wind-up lever 1 is rotated counter-clockwise (in the direction of arrow C in FIG. 1, the toothed wheel $3_3$ also rotates counter-clockwise together with the lever 1. When the wind-up lever 1 is rotated clockwise, however, the toothed wheel $3_3$ does not rotate and the lever 1 rotates alone. The one-way clutch device 3 is a known arrangement for a film feeding device of a camera. A reference numeral 4 indicates a shaft which is rotatably held by the camera body. The toothed wheel $3_3$ of the one-way clutch device is secured to one end of the shaft 4. A reference numeral 6 indicates a toothed wheel which is secured to the other end of the shaft 4; and 10 indicates a spool gear tube rotatably disposed on the shaft 4. The spool gear tube 10 is provided with a flat disc-shaped flange part $10_3$ which is disposed at one end of a tube part $10_2$ and a toothed wheel part $10_4$ which is disposed at the other end of the tube part. On the inner face of the toothed wheel part $10_4$, there is a cam $10_1$ which is secured thereto. The spool gear tube 10 is prevented by an unillustrated means from moving downward on the shaft 4 beyond a preset limit. A reference numeral 11 indicates a spool which is rotatably disposed on the shaft 4 and which is prevented by an unillustrated means from moving upward on the shaft 4 beyond a preset limit. A reference numeral 13 indicates a coil spring which is disposed between the spool 11 and the flange part $10_3$ of the spool gear tube 10. The coil spring 13 provides friction between the flange part $10_3$ and the spring and friction between the spool 11 and the spring 13 in such a way as to transmit the rotation of the gear tube 10 to the spool 11. A reference numeral 7 indicates a gear member of two step arrangement comprising a toothed wheel $7a$ which constantly engages with the toothed wheel 6 and a toothed wheel $7b$ which constantly engages with the toothed wheel $10_4$, the gear member 7 being rotatably carried by the camera body; and 8 indicates a gear member rotatably carried by the camera body. The gear member 8 comprises a cylindrical part $8_2$, a toothed wheel $8_1$ inseparably formed together with the cylindrical part $8_2$ at one end thereof and a plurality of clutch grooves $8_3$ provided in the other end of the cylindrical part. The toothed wheel $8_1$ is disposed at a position to allow it to constantly engage with the toothed wheel $7b$ of the gear member 7. A reference numeral 14 indicates a center shaft, which is disposed inside the cylindrical part $8_2$ to be slidable and rotatable therein and the tip portion $14c$ of which is carried by the camera body in such a manner as to be rotatable and to be slidable in the direction of its axis. The center shaft 14 is also provided with a part $14d$ and a part $14f$, the diameter of the part $14f$ being larger than that of the part $14d$. The center shaft 14 is urged downward by a spring 15. A reference numeral 9 indicates a sprocket having a cylindrical part in the middle part thereof, with the center shaft 14 slidably disposed inside the cylindrical part of the sprocket 9. Further, the sprocket 9 is provided with a slot $9'$ and also with an unillustrated member which prevents the sprocket from moving in the direction of its axis. A pin $14a$ is planted in the center shaft 14, which engages with a clutch groove $8_3$ of the gear member 8 when the center shaft 14 is shifted downward and which retreats from the clutch groove $8_3$ when the center shaft moves upward against the urging force of the compression spring 15. With the center shaft 14 shifted to a lower position and thus being in engagement with the clutch groove $8_3$, the pin $14a$ causes the center shaft 14 to rotate together with the gear member 8 when the gear member is rotated. With the center shaft 14 shifted to an upper position and thus in a state of being disengaged from the clutch groove $8_3$, the pin $14a$ does not serve to allow the rotation of the gear member 8 to be transmitted to the center shaft when the gear member 8 is rotated. Thus, a clutch mechanism is formed by the pin $14a$ and the clutch groove $8_3$. Another pin $14b$ is also planted in the center shaft 14 and is disposed at a position to have its tip within the slot $9'$ of the sprocket 9. The pin $14b$ is in a free state inside the slot $9'$ of the sprocket 9 when the center shaft 14 moves up and down but causes the sprocket 9 to rotate together with the center shaft 14 when the center shaft 14 is rotated. A reference numeral 16 indicates a locking lever which is rotatable on a supporting shaft 50 secured to the camera body. The locking lever 16 consists of a lever end $16c$ which can be brought into contact with the cam $10_1$ of the gear tube 10 and another lever end $16b$ which can be brought into contact with the center shaft 14 and is constantly urged by a tension spring $16a$ to rotate counterclockwise. When the center shaft 14 is shifted to a lower position, the part $14f$ of the center shaft 14 is in contact with the lever end $16b$ and the lever 16 is in a position of having rotated clockwise while the other lever end $16c$ is in a state of being detached from the cam $10_1$. When the center shaft 14 is shifted to an upper position against the urging force of the spring 15, the lever end $16b$ comes into contact with the part $14f$ of the center shaft 14 and, accordingly, the spring $16a$ causes the lever 16 to turn counterclockwise. Then, under this condition, even when the force causing the center shaft 14 to shift upward against the urging force of a spring 15 is removed, the center shaft 14 stays in a state of being shifted to the upper position because the lever end $16b$ is engaged with the stepped portion formed by the parts $14f$ and $14d$. For releasing the center shaft 14 from the state of being locked in the upper position, the gear tube 10 is rotated by the wind-up lever 1 in the direction of C. In other words, when the gear tube 10 is rotated, the cam $10_1$ rotates together with the gear tube 10 to move the lever end $16c$ in such a way as to turn the lever 16 clockwise. Accordingly, the lever end $16b$ moves away from the center shaft 14, so that the urging force of the spring 15 comes to push the center shaft 14 downward.

Figure 2:
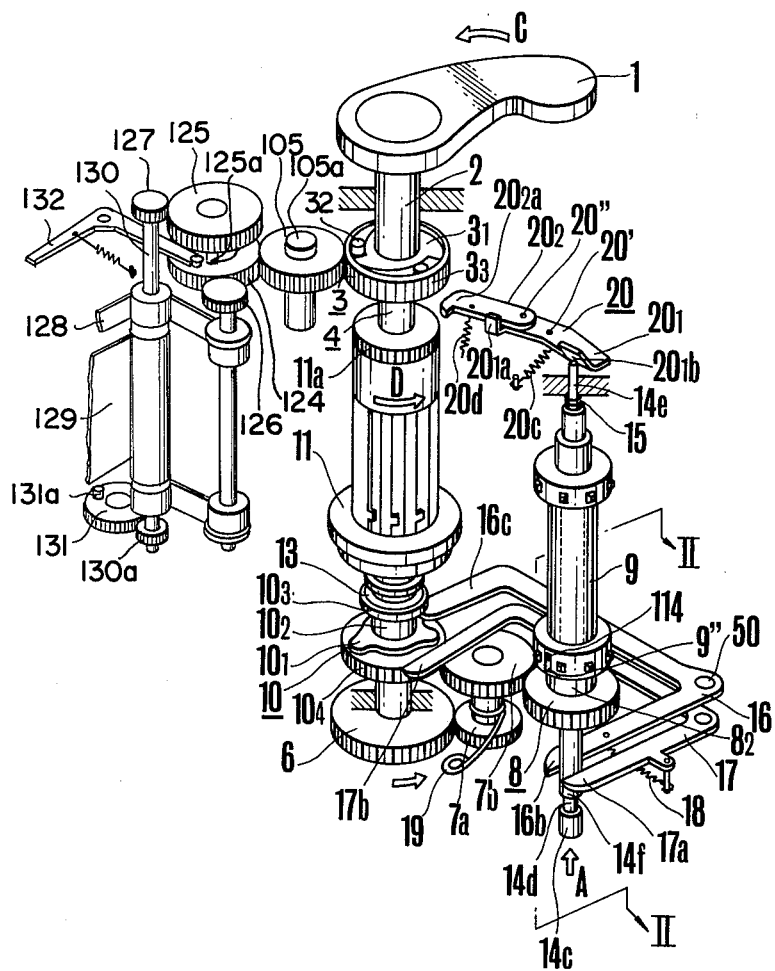
FIG. 2 is an oblique view illustrating an embodiment of this invention.

The film feeding device of the conventional cameras which is arranged as described in the foregoing operates as follows: FIG. 1 illustrates the device as in a condition wherein a rewinding button secured to the other end of the center shaft 14 protruding from the bottom of the camera body is pushed upward for rewinding the film and the pin $14a$ of the center shaft 14 is disengaged from the clutch groove $8_3$ of the gear member 8. For winding up the film in the normal direction, however, the center shaft 14 must be shifted to a lower position; the pin $14a$ of the center shaft 14 must be engaged with the clutch groove $8_3$ of the gear member 8; the part $14f$ of the center shaft 14 must be located at a position corresponding to the lever end $16b$ of the lever 16; and the swinging lever 16 must be turned clockwise against the urging force of the spring $16a$. As mentioned in the foregoing, such a condition can be brought about by just turning the wind-up lever 1 in the direction of the arrow C. With the wind-up lever 1 turned in the direction of the arrow C, the one-way clutch device 3 rotates clockwise to actuate a shutter charging mechanism. The shutter mechanism shown in FIG. 2 is a conventional focal plane shutter which has a master gear 124 for the front screen and a master gear 125 for the rear screen. The shutter charge is done by charging the master gear 124 for the front screen by a known method by the winding-up lever 1 through the gears $3_3$ and 105. By the charge of the master gear 124 for the front screen, the rear screen is charged simultaneously through the spring 125a of the master gear 125 for the rear screen. 126 and 127 are respectively a pinion for the front screen and a pinion for the rear screen, having a front screen ribbon 128 and a rear screen ribbon 129. The rear screen pinion axis 130 is provided with a gear 130a at its lower end, which gear 130a engages with a gear 131 for the rear screen completion signal. On this gear 131 a pinion 131a is planted. 132 is a releasing lever for the front screen and performs the shutter release in a conventional manner. Then, at the same time, the shaft 4 is rotated to cause the toothed wheel 7b to be rotated through the toothed wheel 6 and the toothed wheel 7b to be rotated through the toothed wheel 6 and the toothed wheel 7a. With the toothed wheel 7b rotated, the rotation causes the toothed wheels $10_4$ and $8_1$ to rotate simultaneously. The rotation of the toothed wheel $10_4$ causes the spool 11 to rotate in the direction of the arrow D through the spring 13. The rotation of the toothed wheel $8_1$ causes the sprocket 9 to receive the rotation of the toothed wheel 8, through the clutch groove $8_3$, the pin 14a, the center shaft 14 and the pin 14b. The film is then wound up on the spool 11 with the film being followed by the sprocket 9. The degree of winding up the film on the spool 11 is determined by restricting the degree of rotation of the wind-up lever 1 in the direction of the arrow C beforehand. For film rewinding, the button 14c is pushed in the direction of arrow A to move the center shaft 14 upward and thus to release the pin 14a from its engagement with the clutch groove $8_3$ as illustrated in FIG. 1. Under this condition, the part 14d of the center shaft 14 is located at a position corresponding to the lever end 16b of the swinging lever 16 and the swinging lever 16 is brought into a state of having been turned clockwise. With the lever 16 being in this state, the center shaft 14 is kept in the state of having been shifted upward even after the button 14c is released from being pressed in the direction of the arrow A, because the lever end 16b of the swinging lever 16 is engaging with the stepped portion formed by the parts 14d and 14f. In other words, under this condition, the sprocket 9 is freely rotatable together with the center shaft 14. Therefore, when an unillustrated rewinding lever is rotated, the film is pulled in the reverse direction. The spool 11 on which the film has been wound up is rotated in the reverse direction by the pulling force of the film to allow film rewinding gradually. In the meantime, the sprocket 9 which has been made to be freely rotatable then follows the film rewinding operation. Further, when the spool 11 rotates in the reverse direction, the rotation of the spool 11 is absorbed by a friction mechanism formed by the spring 13 and not transmitted to the shaft 4. After completion of film rewinding, in order to forward film in the normal direction, the wind-up lever 1 is turned in the direction of the arrow C to rotate the toothed wheel 10. Then, the center shaft is released by this from the upward shifted state to permit film feeding in the normal direction.

In the film feeding device of the conventional cameras which is arranged as described in the foregoing, the rotation of the gear member 8 is transmitted to the sprocket 9 through the clutch groove $8_3$, pins 14a, 14b and the slot 9'. Therefore, if there are gaps or clearances between the clutch groove $8_3$ and the pin 14a and between the slot 9' and the pin 14b, there arises a play to an extent corresponding to the sum of these gaps even when such gaps are very narrow. Then, since these engaging parts 9', 14b; $8_3$, 14a are provided at part having small diameters, such a play becomes a great value at the gear member 8. Under such a condition, therefore, even if the sprocket 9 is accurately turned by a film winding operation to a degree of angle exactly corresponding to one frame of the film, the resilience of the film resulting from its wound-up condition, etc. causes the sprocket to turn backward as much as the degree of the play after the sprocket is stopped with the film winding operation. Then, such backward turning of the sprocket 9 results in uneven spacing between one picture and another.

In accordance with this invention such gaps at engaging parts are reduced to minimal degrees. An embodiment example of the invented film feeding device is illustrated in FIGS. 2 and 3.

Figure 3:
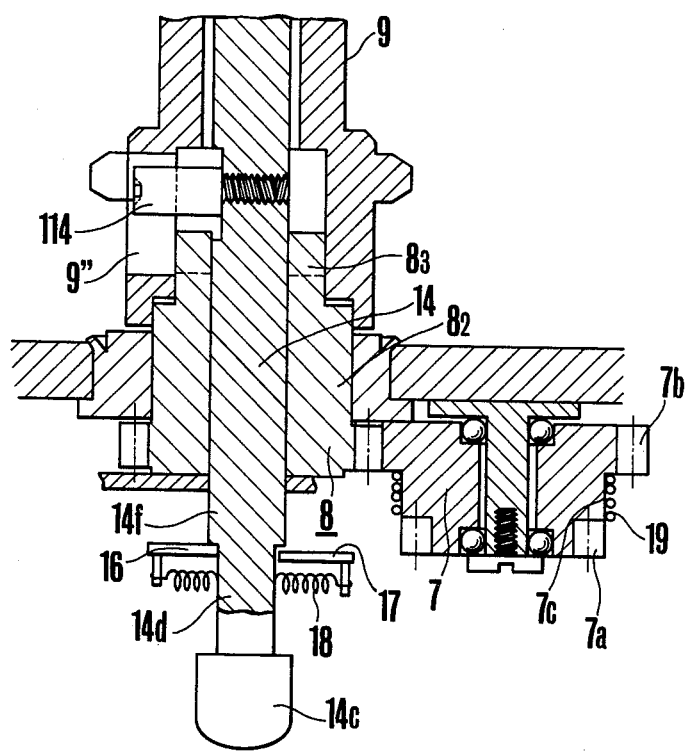
FIG. 3 is a vertical section across a line II—II of FIG. 2.

In FIGS. 2 and 3, parts performing the same functions as those of FIG. 1 are indicated by like reference numerals. Referring to FIGS. 2 and 3, a cylindrical part $8_2$ of a gear member 8 is loosely inserted in a sprocket with its upper end portion having clutch grooves $8_3$ in the same manner as in the conventional device. A pin 114 which can be fitted in the clutch groove $8_3$ is screwed into a center shaft 14. The pin 114 can be engaged with and disengaged from the clutch groove through the operation of a rewinding button 14c in the same manner as in the conventional device illustrated in FIG. 1. The tip of the pin 114 is inserted in a slot 9" provided in a large diameter portion of the sprocket 9 and is slidable up and down inside the slot 9" according as the center shaft 14 moves. In this manner, in accordance with this invention, the same pin 114 is arranged to be inserted both into the clutch groove $8_3$ and in the sprocket 9. This simplifies the structure of the device. Further, since the pin 114 is fitted in the large diameter portion of the sprocket, even if there is provided a sufficient clearance to permit smooth sliding movement of the pin 114 inside the slot 9", the clearance or play will not be enlarged to a greater degree, so that the unevenness of spacing between pictures can be reduced to a minimal degree. In addition to that, the clearance between the pin 114 and the clutch groove $8_3$ can be eliminated by forming the groove into a slightly tapered shape. Furthermore, with a cross or hexagonal recess provided in the head portion of the pin 114 with increased diameter, the pin 114 can be tightly screwed into the center shaft 14 using a greater force. Such arrangement will prevent the hitherto experienced inconvenience caused by the edges of a minus-shape slit provided in the pin of the conventional device when such edges stick to the clutch groove $8_3$. On the other hand, a reverse turn preventing spring 19 is wound round the barrel part of a double toothed wheel arrangement 7a and 7b to prevent reverse turning at the nearest point to a sprocket wheel 8.

A reference numeral 16 indicates a locking lever which is similar to the locking lever indicated in FIG. 1; 17 indicates a second locking lever which is rotatable on the same shaft 50 on which the lever 16 is also rotatable. The tips 16b and 17a of these levers 16 and 17 are disposed to confront each other across the shaft 14 and are pulled by a spring 18 toward each other being thus brought into contact with the shaft 14 respectively. A reference numeral 20 indicates a stop claw for the spool 11. The stop claw comprises a first stop claw member $20_1$ which is rotatably supported by a shaft 20' while the shaft is secured to the camera body and a second stop claw member $20_2$ rotatably supported by a shaft 20"0 which is secured to the stop claw member $20_1$. The first stop claw member $20_1$ has a bent part $20_1a$ and a slanting part $20_1b$ for restricting the counterclockwise rotation of the second stop claw member $20_2$ and is urged by a spring $20c$ to rotate clockwise. The tip of the second stop claw member $20_2$ is formed into a stop claw $20_2a$ and the second stop claw is urged by a spring $20d$ to rotate counterclockwise. The intensity of force of the spring $20c$ is greater than that of the spring $20d$. Therefore, when the urging force of the spring $20c$ causes the first stop claw member $20_1$ to rotate clockwise, the second stop claw member $20_2$ is overcome by the urging force of the spring $20c$ and thus rotates together with the first stop claw member $20_1$. For double exposure photographing, therefore, when the rewinding button 14c is pushed in the direction of arrow A, the slanting part $20_1b$ of the stop claw 20 is pressed by the upper end of the shaft 14 and, by this, the stop claw rotates counterclockwise on the shaft 20'; then, the tip $20_2a$ of the stop claw 20 is brought into engagement with a ratchet wheel part 11a provided on the outer circumference of the barrel portion of the spool 11. Then, the pin 114 provided on the shaft 14 comes to disengage from the clutch groove $8_3$ to bring the sprocket 9 into a freely rotatable state. The levers 16 and 17 are rotated by the spring 18 to fall onto the stepped part 14d. By this, the shaft 14 is locked in an upward shifted state while the other ends 16c and 17b of the levers 16 and 17 enter a rotating path of a cam $10_1$. Under such a condition, when the wind-up lever 1 is turned in the direction of arrow C, an unillustrated shutter is charged through a toothed wheel 3 as described in the foregoing and the toothed wheels 6, 7, 8 and 10 are rotated through a shaft 4. However, since the clutch $8_3$ and 14a is disengaged, the sprocket 9 does not rotate. Further, since the spool 11 is also prevented by the stop claw 20 from rotating, the operating force of the wind-up lever 1 is absorbed between the spring 13 and the sprocket 11 and between the spring 13 and a disc part $10_3$. Thus the film is not forwarded.

Under this condition, when the cam $10_1$ slightly turns, the proturudent part of the cam pushes the tip 16c of the lever 16 to cause it to rotate clockwise on the shaft 50. This causes the other end 16b to disengage from the stepped part 14d of the shaft 14. In the meantime, however, the shaft 14 is still locked by the lever 17. When the wind-up shaft 4 is rotated a preset degree of angle to charge the shutter, another protrudent part of the cam $10_1$ immediately comes into contact with the tip 17b of the locking lever 17 to cause the locking lever 17 to rotate counterclockwise and thus to disengage the other end 17a from the shaft 14. The shaft 14 is then is pushed downward by the spring 15 and the pin 114 comes into engagement with the clutch groove $8_3$. Concurrently with this, the claw 20 is caused by the spring 20c to rotate clockwise to unlock the spool thereby. After disengagement from the stepped part of the shaft 14, the lever 16 is supported by the protrudent part of the cam $10_1$ until the protrudent part passes away. After passing of the protrudent cam part, the lever 16 engages with the large diameter part 14f of the center shaft 14 to be held thereby as the downward urging force of the spring 15 causes the descent of the shaft 14. In this manner, the lever 16 never comes into engagement with the stepped part formed by the larger diameter part 14f and the smaller diameter part 14d of the shaft 14 during the wind-up operation and allows the shaft 14 to return concurrently with completion of shutter charging.

In the case of a rewinding operation, the rewinding button 14c is also pushed up, in the same manner as described in the foregoing, to set the sprocket free. However, the toothed part 11a of the spool 11 is formed as a ratchet wheel in such a manner as to prevent rotation in the winding up direction and to permit rotation in the rewinding direction while the stop claw 20 which engages with the ratchet tooth part 11a of the spool 11 is also formed in a double structure as illustrated in the drawing. This arrangement, therefore, ensures that the film can be rewound by the rewinding operation without any trouble.

In accordance with this invention, as described in the foregoing, the structure of the sprocket part is simplified and, at the same time, it is made possible to make improvement in respect to the shortcoming of the conventional device caused by the gaps or clearances between engaging parts which have heretofore greatly hindered even spacing between one picture and another.

What is claimed is:

1. A film feeding device for a camera comprising;
   (a) a film wind-up means which gradually winds a preset amount of film on a film take-up spool;
   (b) a film feeding cylindrical sprocket which is capable of rotating only and which is provided with a slot extending substantially in parallel with the axis of the sprocket;
   (c) a cylindrical sprocket driving means which is capable of rotating only and which is interlocked with the film wind-up means to be driven in response to a film winding operation of the film wind-up means, said means being disposed coaxially with said sprocket and said means having clutch grooves formed to correspond to one end of the slot provided in said sprocket; and
   (d) a shaft member loosely fitted inside said sprocket and said sprocket driving means, the shaft member being provided with a clutch pin which is slidably fitted in the slot of said sprocket;
   and wherein the moving extent of said shaft member in the direction of its axis is restricted by the length of the slot of the sprocket through the clutch pin when the shaft member moves in the direction of its axis; the sprocket is caused to rotate together with the shaft member by the clutch pin when the shaft member rotates; and, when the shaft member moves to one side within the restriction being imposed by the slot, the clutch pin comes to mechanically engage with said clutch groove thus to transmit the driving force of the sprocket driving means to the shaft member and, when the shaft member shifts to the other side, the clutch pin is disengaged from the clutch groove to release the sprocket driving means from mechanical engagement with the shaft member and thereby the permit free rotation of said sprocket.

2. A device according to claim 1, wherein said shaft member is constantly urged by an urging means to move in the direction in which said clutch pin comes to engage with said clutch groove of the sprocket driving means.

3. A device according to claim 1, wherein said film wind-up means is mechanically engaged with said sprocket driving means.

4. A film feeding device for a camera comprising;

(a) a film take-up spool which is capable of rotating in both directions only;

(b) a film wind-up means which gradually winds a preset amount of film on the film take-up spool, the film wind-up means including;
  a rotatable wind-up operation means;
  a rotating means which is interlocked with said wind-up operation means to be rotated by the operation thereof;
  a transmission means which transmits the rotation of the wind-up operation means to said rotating means only when the wind-up operation means rotates in one direction, the transmission means being disposed between the wind-up operation means and the rotating means; and
  a friction means disposed between said rotating means and said spool;

(c) a cylindrical film feeding sprocket which is capable of rotating only and which is provided with a slot extending substantially in parallel with the axis of the sprocket;

(d) a cylindrical sprocket driving means which is capable of rotating only and which is driven in response to a film wind-up operation of said film wind-up means, said sprocket driving means being mechanically linked to said rotating means and having clutch grooves formed to correspond to one end of the slot provided in said sprocket;

(e) a shaft member loosely fitted inside said sprocket and said sprocket driving means, the shaft member being provided with a clutch pin which is sidably fitted in the slot of said sprocket, the moving extent of said shaft member being restricted by the length of the slot of the sprocket through the clutch pin when the shaft member moves in the direction of its axis, the clutch pin causing the sprocket to rotate together with the shaft member when the shaft member rotates, the clutch pin coming to mechanically engage with said clutch groove to transmit the driving force of the sprocket driving means to the shaft member when the shaft member moves to one side within the restriction imposed by the slot and, the clutch pin being disengaged from the clutch groove to release the sprocket driving means from mechanical engagement with the shaft member and thus to permit free rotation of said sprocket when the shaft member shifts to the other side;

(f) an urging means which constantly urges said shaft member to move in the direction in which said clutch pin comes to engage with said clutch groove; and (g) a locking means which automatically locks said shaft member in a position in which said clutch pin is disengaged from said clutch groove when said shaft member is moved to the position against the urging force of said urging means and which is capable of automatically unlocking the shaft member in response to the rotation of said rotating means, said locking means being provided with a detecting means which detects the rotation of said rotating means.

5. A film feeding device for a camera according to claim 4, wherein said rotating means is provided with a cam means for controlling the unlocking action of said locking means while said detecting means of the locking means is operatively coupled to said cam means.

6. A film feeding device for a camera according to claim 4, wherein said shaft member includes a larger diameter part in which said clutch pin is provided and a smaller diameter part which extends from the larger diameter part; a stepped engaging part is formed by the difference in diameter between the larger diameter part and the smaller diameter part; and one end of said locking means engages with said stepped engaging part to lock said shaft member.

7. A film feeding device for a camera which permits multiple exposure photographing and which comprises;

(a) a film take-up spool which is rotatable;

(b) a film wind-up means which gradually winds a preset amount of film on the film take-up spool, the film wind-up means including;
  a rotatable wind-up operation means;
  a rotating means which is interlocked with said wind-up operation means to be rotated in response to the operation thereof, the rotating means adapted to be operatively coupled to a shutter mechanism to charge the shutter mechanism when it rotates;
  a transmission means which transmits the rotation of the wind-up operation means to said rotating means only when the wind-up operation means rotates in one direction, the transmission means being disposed between the wind-up operation means and the rotating means; and a friction means disposed between said rotating means and said spool;

(c) a rotatable cylindrical film feeding sprocket which is provided with a slot in one part thereof, the slot being formed to extend substanially in parallel with the axis of the sprocket;

(d) a cylindrical sprocket driving means which is driven to rotate in response to the film winding operation of said film wind-up means, said sprocket driving means being mechanically linked to said rotating means and, at the same time, having clutch grooves formed to correspond to one end of the slot provided in said sprocket;

(e) a shaft member loosely fitted inside said sprocket and said sprocket driving means, the shaft member being provided with a clutch pin which is slidably fitted in the slot of said sprocket, the moving extent of said shaft member being restricted by the length of the slot of said sprocket through the clutch pin when the shaft member moves in the direction of its axis, the clutch pin causing the sprocket to rotate together with the shaft member when the shaft member rotates, the clutch pin coming to mechanically engage with said clutch groove to transmit the driving force of the sprocket driving means to the shaft member when the shaft member moves to one side within the restriction imposed by the slot, and the clutch pin being disengaged from the clutch groove to release the sprocket driving means from mechanical engagement with the shaft member and thus to permit free rotation of said sprocket when the shaft member shifts to the other side;

(f) an urging means which constantly urges said shaft member to move in the direction in which said clutch pin comes to engage with said clutch groove of said sprocket driving means;

(g) a locking means which is capable of temporarily locking said shaft member in a position in which said clutch pin is disengaged from said clutch groove when said shaft member is moved to the position against the urging force of said urging means;

(h) a locking control means which, when said locking means is actuated, keeps the locking means operative until at least the first discharge of a charged force is made by said shutter mechanism which has been charged by the operation of said rotating means; and (i) a spool control means which, in response to the movement of said shaft member to a position where said clutch pin is disengaged from said clutch groove, prohibits said spool from rotating in the winding up direction and which releases the spool from such prohibition in response to the movement of the shaft member back to a position where the clutch pin comes to engage with the clutch groove.

8. A film feeding device according to claim 7, wherein said locking control means includes a cam means which rotates together with said rotating means and which is operatively coupled to said locking means.

9. A film feeding device according to claim 7, wherein said spool control means includes a ratchet wheel which rotates together with said spool and a ratchet claw which engages with the ratchet wheel in response to the movement of said shaft member to a position where said clutch pin is disengaged from said clutch groove and which disengages from the ratchet wheel in response to the movement of the shaft member to a position where the clutch pin comes to engage with the clutch groove.

10. A film feeding device according to claim 7, wherein said shaft member includes a larger diameter part in which said clutch pin is provided and a smaller diameter part which extends from the larger diameter part; a stepped engaging part is formed by the difference in diameter between the larger diameter part and the smaller diameter part; and one end of said locking means engages with said stepped engaging part to lock said shaft member.

* * * * *